(12) United States Patent
Fujie et al.

(10) Patent No.: US 7,947,625 B2
(45) Date of Patent: May 24, 2011

(54) INK SHEET FOR HEAT-SENSITIVE TRANSFER RECORDING MATERIAL, HEAT-SENSITIVE TRANSFER RECORDING METHOD, INK CARTRIDGE AND AZO DYE

(75) Inventors: Yoshihiko Fujie, Kanagawa (JP);
Hisashi Mikoshiba, Kanagawa (JP);
Kazufumi Omura, Kanagawa (JP);
Ryuji Shinohara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1030 days.

(21) Appl. No.: 11/711,776

(22) Filed: Feb. 28, 2007

(65) Prior Publication Data
US 2007/0202282 A1    Aug. 30, 2007

(30) Foreign Application Priority Data

Feb. 28, 2006    (JP) .................. 2006-051693

(51) Int. Cl.
*B41M 5/035*    (2006.01)
*B41M 5/50*    (2006.01)
*C09B 45/00*    (2006.01)
(52) U.S. Cl. ...................... 503/227; 534/707
(58) Field of Classification Search ........................ None
See application file for complete search history.

(56) References Cited

U.S. PATENT DOCUMENTS

| | | | |
|---|---|---|---|
| 4,885,272 A | 12/1989 | Chapman et al. | |
| 4,981,837 A | 1/1991 | Tanaka et al. | |
| 6,468,338 B1 | 10/2002 | Evans et al. | |
| 6,855,195 B2 | 2/2005 | Nishita et al. | |
| 6,866,706 B2 | 3/2005 | Ishida et al. | |

FOREIGN PATENT DOCUMENTS

| | | |
|---|---|---|
| EP | 0 717 081 A1 | 6/1996 |
| JP | 6-106862 A | 4/1994 |
| JP | 2005-226022 A | 8/2005 |

OTHER PUBLICATIONS

Japanese Official Action dated Oct. 29, 2009.
Japanese Official Action dated Oct. 20, 2009.

*Primary Examiner* — Bruce H Hess
(74) *Attorney, Agent, or Firm* — Sughrue Mion, PLLC

(57) ABSTRACT

An ink sheet for heat-sensitive transfer recording material comprising an azo dye represented by the following formula (1):

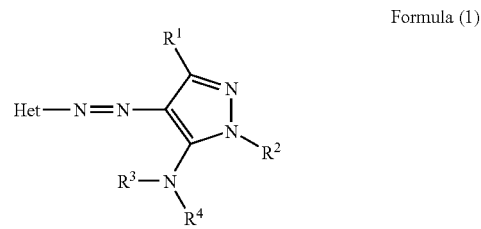

Formula (1)

wherein $R^1$, $R^2$, $R^3$ and $R^4$ represent a hydrogen atom or substituent; and Het represents a heterocyclic group which may have substituents or a condensed ring.

7 Claims, No Drawings

INK SHEET FOR HEAT-SENSITIVE TRANSFER RECORDING MATERIAL, HEAT-SENSITIVE TRANSFER RECORDING METHOD, INK CARTRIDGE AND AZO DYE

BACKGROUND OF THE INVENTION

1. Field of the Invention

The present invention relates to an ink sheet for heat-sensitive transfer recording material containing a specific azo dye, a heat-sensitive transfer recording method, an ink cartridge and a novel azo dye.

2. Description of the Related Art

In recent years, as image recording materials there have been mainly used materials for forming a color image in particular. In some detail, ink jet process recording materials, heat-sensitive transfer type image recording materials, recording materials using electrophotographic process, transfer type silver halide photographic materials, printing inks, recording pens, etc. have been widely used.

In these color image recording materials, colorants (dye or pigment) of additive or subtractive primaries are used to reproduce or record a full-color image. However, it is the status of quo that there are no colorants which have absorption characteristics allowing the realization of desirable color reproduction range and can withstand various working conditions. It has thus been keenly desired to have improvements in this respect.

Heat-sensitive transfer recording processes include a process which comprises heating a heat-sensitive transfer material comprising a heat-fusible ink layer formed on a base film (support) using a thermal head to melt the ink so that it is recorded on the image-receiving material and a process which comprises heating a heat-transfer material comprising a dye-providing layer containing a heat-movable dye formed on a base film to cause the dye to be heat-diffused and transferred on the image-receiving material. The latter heat-sensitive transfer recording process involves the change of the energy applied to the thermal head, making it possible to change the transferred amount of the dye. Thus, tone recording can be easily effected. This heat-sensitive transfer recording process is favorable particularly for full-color recording of high quality images. However, the heat-movable dyes to be used in this heat-sensitive transfer recording process have various limitations. There are extremely few heat-movable dyes which satisfy all the requirements.

These heat-movable dyes are required to have spectral characteristics desirable for color reproduction, be easily transferred, be fast to light, heat and various chemicals, be easily synthesized and easily form a heat-sensitive transfer recording material. It has thus been desired to develop a dye having excellent spectral characteristics and a high lightfastness.

On the other hand, azo dyes having an azo bond in the 4-position of pyrazole are disclosed in JP-A-2005-162812, JP-A-2003-41160, JP-A-2003-41161, JP-A-2003-41162, JP-A-2003-41163, JP-A-2003-128953, JP-A-2002-194258 and JP-A-8-231867. Azo dyes having 5-aminopyrazole as a coupling component are disclosed in JP-A-2005-226022, JP-A-2003-221535, JP-A-2003-128953, JP-A-8-90939, JP-A-6-106862, JP-A-2-24191 and JP-A-1-225592. However, none of these patent references refer to the fact that the azo dye of the following formula (1) can be effectively used in heat-sensitive transfer recording process.

SUMMARY OF THE INVENTION

It is therefore an object of the invention to provide an ink sheet for heat-sensitive transfer recording material containing an azo dye having excellent spectral properties, including sharp absorption, and a high fastness, a heat-sensitive transfer recording method using same, an ink cartridge having the ink sheet mounted thereon and a novel azo dye. It is another object of the invention to provide an ink sheet for heat-sensitive transfer recording material having an excellent color reproducibility in print sample and excellent image storage properties, including little image bleeding with time under high temperature and humidity conditions and little occurrence of retransfer, a heat-sensitive transfer recording method using same, an ink cartridge having the ink sheet mounted thereon and a novel azo dye.

The present inventors made extensive studies. As a result, it has been found that the aforementioned objects of the invention can be achieved by the following constitutions.

(1) An ink sheet for heat-sensitive transfer recording material comprising an azo dye represented by the following formula (1):

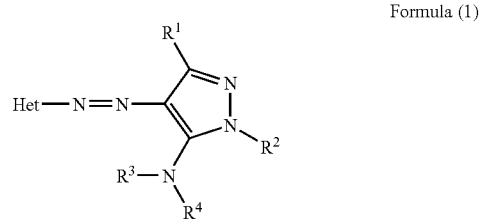

Formula (1)

wherein $R^1$, $R^2$, $R^3$ and $R^4$ each independently represent a hydrogen atom or substituent; and Het represents a heterocyclic group which may have substituents or a condensed ring.

(2) The ink sheet for heat-sensitive transfer recording material according to Clause (1), wherein Het is a heterocyclic group selected from the following group 1:

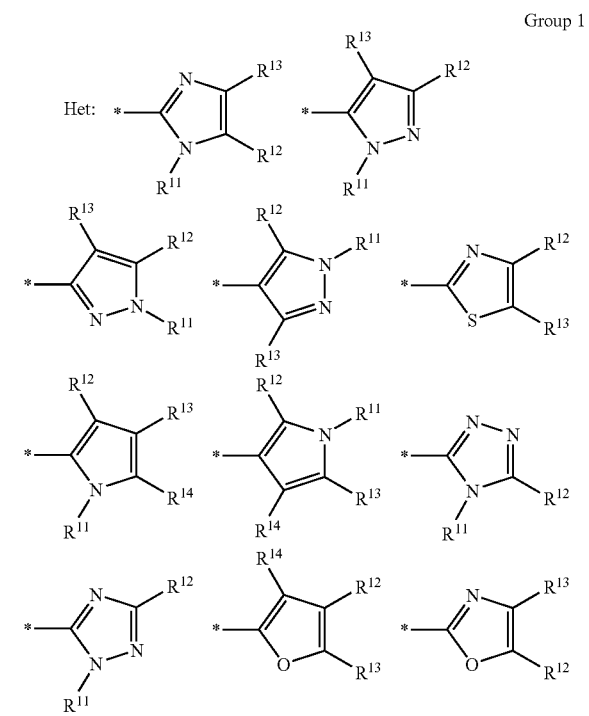

Group 1

-continued

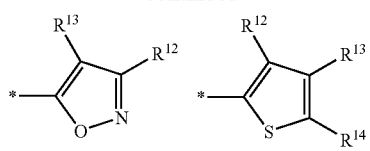

wherein $R^{11}$, $R^{12}$, $R^{13}$ and $R^{14}$ each independently represent a hydrogen atom or substituent.

(3) The ink sheet for heat-sensitive transfer recording material according to Clause (1), wherein Het is a heterocyclic group selected from the following group 2:

Group 2

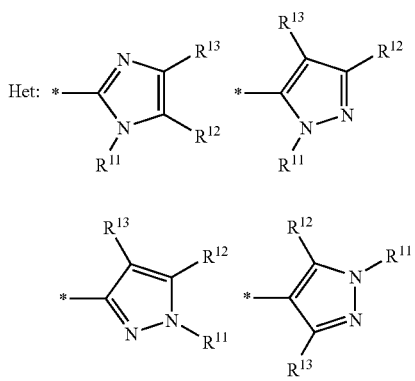

wherein $R^{11}$, $R^{12}$ and $R^{13}$ each independently represent a hydrogen atom or substituent.

(4) The ink sheet for heat-sensitive transfer recording material according to Clause (1), wherein Het is a heterocyclic group selected from the following group 3:

Group 3

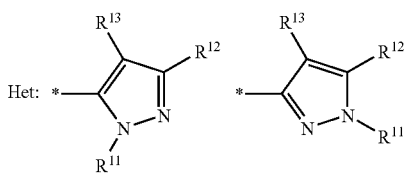

wherein $R^{11}$, $R^{12}$ and $R^{13}$ each independently represent a hydrogen atom or substituent.

(5) The ink sheet for heat-sensitive transfer recording material according to Clause (1), wherein the azo dye is an azo dye represented by the following formula (2) or (3):

Formula (2)

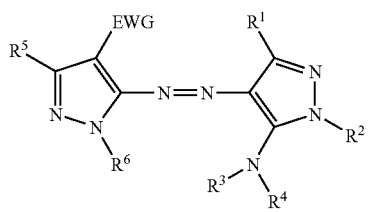

Formula (3)

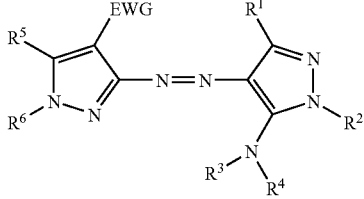

wherein $R^1$, $R^2$, $R^3$, $R^4$, $R^5$ and $R^6$ each independently represent a hydrogen atom or monovalent substituent; and EWG represents an electron-withdrawing group.

(6) A heat-sensitive transfer recording method which comprises forming an image on an image-receiving material comprising an ink-receiving layer containing a polymer provided on a support using an ink sheet for heat-sensitive transfer recording material according to any one of clauses (1) to (5).

(7) An ink cartridge having an ink sheet for heat-sensitive transfer recording material according to any one of Clauses (1) to (5) mounted thereon.

(8) An azo dye represented by the following formula (4) or (5):

Formula (4)

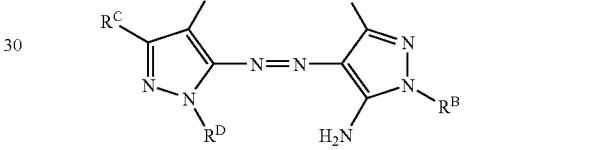

Formula (5)

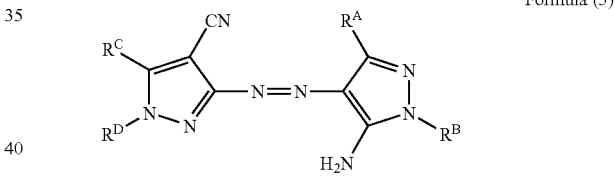

wherein $R^A$, $R^B$, $R^C$ and $R^D$ each independently represent a hydrogen atom or a $C_1$-$C_6$ alkyl group which may be substituted.

In accordance with the invention, an ink sheet for heat-sensitive transfer recording material containing an azo dye having excellent spectral properties, including sharp absorption, and a high fastness, a heat-sensitive transfer recording method using same and an ink cartridge having the ink sheet mounted thereon can be provided. Further, an ink sheet for heat-sensitive transfer recording material having an excellent color reproducibility in print sample and excellent image storage properties, including little image bleeding with time under high temperature and humidity conditions and little occurrence of retransfer, a heat-sensitive transfer recording method using same, an ink cartridge having the ink sheet mounted thereon and a novel azo dye.

BEST MODE FOR CARRYING OUT THE INVENTION

The ink sheet for heat-sensitive transfer recording material of the invention, the azo dye to be incorporated therein, etc. will be further described hereinafter. The following description of the constituent requirements is occasionally made on the basis of representative embodiments of the present invention, but the present invention is not limited thereto. The numerical range represented by the term " to " include the numerical values set forth before and after "to" as lower and upper limits, respectively.

The azo dye represented by the formula (1) to be incorporated in the ink sheet for heat-sensitive transfer recording material of the invention will be further described below.

In the formula (1), Het represents a heterocyclic group. The heterocyclic group is preferably a substituted or unsubstituted heterocyclic group which can be derived from diazonium salt from the synthetic standpoint of view. Thus, Het is preferably a diazo component. A diazo component is a partial structure which can be introduced by converting a heterocyclic compound having an amino group as a substituent to a diazonium compound (diazonium salt) which then undergoes diazo coupling reaction with a coupler. This concept is often used in the art of azo dye. In other words, the diazo component is a monovalent substituent obtained by removing amino group from an amino-substituted heterocyclic compound which can undergo diazotization reaction. Exemplifying the monovalent heterocyclic group as cyclic structure the substitution site of which is not limited, pyrrole rings, pyrazole rings, triazole rings, thiazole rings, isothiazole rings, benzothiazole rings, 1,3,4-thiadiazole rings, 1,2,4-thiadiazole rings, oxazole rings, benzooxazole rings, imidazole rings, benzoisothiazole rings, thiophene rings, benzothiophene rings, pyridine rings, pyridazine rings, pyrimidine rings, pyrazine rings, indole rings, quinoline rings, purine rings, carbazole rings, and acridine rings can be used. These heterocyclic rings may further have substituents. These heterocyclic rings may be condensed to other rings (e.g., carbon ring, heterocyclic ring).

$R^1$, $R^2$, $R^3$ and $R^4$ each represent a hydrogen atom or substituent. The substituent represented by $R^1$, $R^2$, $R^3$ and $R^4$ is not specifically limited. Representative examples of the substituent represented by $R^1$, $R^2$, $R^3$ and $R^4$ include halogen atoms, alkyl groups (The term "alkyl group" as used herein means a saturated aliphatic group such as cycloalkyl group and bicycloalkyl group), alkenyl groups (The term "alkenyl group" as used herein means an unsaturated aliphatic group having a double bond such as cycloalkenyl group and bicycloalkenyl group), alkinyl groups, aryl groups, heterocyclic groups, cyano groups, alkoxy groups, aryloxy groups, acyloxy groups, carbamoyloxy groups, alkoxycarbonyloxy groups, aryloxycarbonyloxy groups, amino groups (including alkylamino group, anilino group, and heterocyclic amino group), acylamino groups, aminocarbonylamino groups, alkoxycarbonylamino groups, aryloxycarbonylamino groups, sulfamoylamino groups, alkylsulfonylamino groups, arylsulfonylamino groups, alkylthio groups, sulfamoyl groups, alkylsulfinyl groups, arylsulfinyl groups, alkylsulfonyl groups, arylsulfonyl groups, acyl groups, aryloxycarbonyl groups, alkoxycarbonyl groups, carbamoyl groups, arylazo groups, heterocyclic azo groups, and imide groups. These substituents may further have substituents.

$R^1$, $R^2$, $R^3$ and $R^4$ will be further described hereinafter.

Examples of the halogen atom represented by $R^1$, $R^2$, $R^3$ and $R^4$ include fluorine atom, chlorine atom, bromine atom, and iodine atom. Preferred among these halogen atoms are chlorine atom and bromine atom. Particularly preferred among these halogen atoms is chlorine atom.

Examples of the alkyl group represented by $R^1$, $R^2$, $R^3$ and $R^4$ include cycloalkyl groups, and bicycloalkyl groups. Examples of these alkyl groups include straight-chain and branched substituted or unsubstituted alkyl groups. The straight-chain or branched substituted or unsubstituted alkyl group is preferably a $C_1$-$C_{30}$ alkyl group. Examples of these alkyl groups include methyl group, ethyl group, n-propyl group, isopropyl group, tert-butyl group, n-octyl group, eicosyl group, 2-chloroethyl group, 2-cyanoethyl group, and 2-ethylhexyl group. Examples of the cycloalkyl groups include substituted or unsubstituted cycloalkyl group. The substituted or unsubstituted cycloalkyl group is preferably a $C_3$-$C_{30}$ cycloalkyl group. Examples of these cycloalkyl groups include cyclohexyl group, cyclopentyl group, and 4-n-dodecylcyclohexyl group. Examples of the bicycloalkyl groups include $C_5$-$C_{30}$ substituted or unsubstituted bicycloalkyl group, i.e., monovalent group obtained by removing one hydrogen atom from $C_5$-$C_{30}$ bicycloalkane. Examples of the bicycloalkyl group include bicyclo[1.2.2]heptan-2-yl group, and bicyclo[2.2.2]octan-3-yl group. A tricyclo structure having many cyclic structures may be included. The term "alkyl" in the substituents described hereinafter (e.g., "alkyl" in alkylthio group) represents "alkyl group" having such a concept.

Examples of the alkenyl group represented by $R^1$, $R^2$, $R^3$ and $R^4$ include cycloalkenyl groups, and bicycloalkenyl groups. The alkenyl group represents a straight-chain, branched or cyclic substituted or unsubstituted alkenyl group. Preferred examples of the alkenyl group include $C_2$-$C_{30}$ substituted or unsubstituted alkenyl groups. Examples of the alkenyl group include vinyl groups, allyl groups, prenyl groups, geranyl groups, and oleyl groups. The cycloalkenyl group is preferably a $C_3$-$C_{30}$ substituted or unsubstituted cycloalkenyl group, i.e., monovalent group obtained by removing one hydrogen atom from $C_3$-$C_{30}$ cycloalkene. Examples of the cycloalkenyl group include 2-cyclopenten-1-yl group, and 2-cyclohexen-1-yl group. Examples of the bicycloalkenyl group include substituted or unsubstituted bicycloalkenyl group. The bicycloalkenyl group is preferably a $C_5$-$C_{30}$ substituted or unsubstituted bicycloalkenyl group, i.e., monovalent group obtained by removing one hydrogen atom from bicycloalkene having one double bond. Examples of the bicycloalkenyl group include bicyclo[2.2.1]hepto-2-en-1-yl group, and bicyclo[2.2.2]octo-2-en-4-yl group.

The alkinyl group represented by $R^1$, $R^2$, $R^3$ and $R^4$ is preferably a $C_2$-$C_{30}$ substituted or unsubstituted alkinyl group. Examples of the alkinyl group include ethinyl group, and propargyl group.

The aryl group represented by $R^1$, $R^2$, $R^3$ and $R^4$ is preferably a $C_6$-$C_{30}$ substituted or unsubstituted aryl group. Examples of the aryl group include phenyl group, p-tollyl group, naphthyl group, m-chlorophenyl group, and o-hexadecanonylaminophenyl group.

The heterocyclic group represented by $R^1$, $R^2$, $R^3$ and $R^4$ is a monovalent group obtained by removing one hydrogen atom from substituted or unsubstituted aromatic or nonaromatic heterocyclic compound. These heterocyclic groups may be further condensed. These heterocyclic groups are preferably a 5- or 6-membered heterocyclic group. Preferred examples of the hetero atoms constituting the heterocyclic ring include oxygen atom, sulfur atom, and nitrogen atom. These heterocyclic groups are preferably a $C_3$-$C_{30}$ 5- or 6-membered aromatic heterocyclic group. Exemplifying the ring constituting the heterocyclic group without limiting the substitution site, pyridine ring, pyrazine ring, pyridazine ring, pyrimidine ring, triazine ring, quinoline ring, isoquinoline ring, quinazoline ring, cinnoline ring, phthalazine ring, quinoxaline ring, pyrrole ring, indole ring, furane ring, benzofurane ring, thiophene ring, benzothiophene ring, pyrazole ring, imidazole ring, benzimidazole ring, triazole ring, oxazole ring, benzoxazole ring, thiazole ring, benzothiazole ring, isothiazole ring, benzisothiazole ring, thiadiazole ring, isooxazole ring, benzisooxazole ring, pyrrolidine ring, piperidine ring, piperazine ring, imidazolidine ring, and thiazoline ring can be used.

Examples of the alkoxy group represented by $R^1$, $R^2$, $R^3$ and $R^4$ include substituted or unsubstituted alkoxy groups. The substituted or unsubstituted alkoxy groups are preferably a $C_1$-$C_{30}$ alkoxy group. Examples of these alkoxy groups include methoxy group, ethoxy group, isopropoxy group, n-octyloxy group, methoxyethoxy group, hydroxyethoxy group, and 3-carboxypropoxy group.

The aryloxy group represented by $R^1$, $R^2$, $R^3$ and $R^4$ is preferably a $C_6$-$C_{30}$ substituted or unsubstituted aryloxy group. Examples of the aryloxy groups include phenoxy group, 2-methylphenoxy group, 4-tert-butylphenoxy group, 3-nitrophenoxy group, and 2-tetradecanoylaminophenoxy group.

The acyloxy group represented by $R^1$, $R^2$, $R^3$ and $R^4$ is preferably a formyloxy group, $C_2$-$C_{30}$ substituted or unsubstituted alkylcarbonyloxy group or $C_6$-$C_{30}$ substituted or unsubstituted arylcarbonyloxy group. Examples of these acyloxy groups include formyloxy group, acetyloxy group, pivaloyloxy group, stearoyloxy group, benzoyloxy group, and p-methoxyphenylcarbonyloxy group.

The carbamoyloxy group represented by $R^1$, $R^2$, $R^3$ and $R^4$ is preferably a $C_1$-$C_{30}$ substituted or unsubstituted carbamoyloxy group. Examples of these carbamoyloxy groups include N,N-dimethylcarbamoyloxy group, N,N-diethylcarbamoyloxy group, morpholinocarbonyloxy group, N,N-di-n-octylcarbonyloxy group, and N-n-octyl carbamoyloxy group.

The alkoxycarbonyloxy group represented by $R^1$, $R^2$, $R^3$ and $R^4$ is preferably a $C_2$-$C_{30}$ substituted or unsubstituted alkoxycarbonyloxy group. Examples of the alkoxycarbonyloxy group include methoxycarbonyloxy group, ethoxycarbonyloxy group, tert-butoxycarbonyloxy group, and n-octylcarbonyloxy group.

The aryloxycarbonyloxy group represented by $R^1$, $R^2$, $R^3$ and $R^4$ is preferably a $C_7$-$C_{30}$ substituted or unsubstituted aryloxycarbonyloxy group. Examples of the aryloxycarbonyl group include phenoxycarbonyloxy group, p-methoxyphenoxycarbonyloxy group, and p-n-hexadecyloxyphenoxycarbonyloxy group.

Examples of the amino group represented by $R^1$, $R^2$, $R^3$ and $R^4$ include alkylamino groups, arylamino groups, and heterocyclic amino groups. The amino group is preferably a $C_1$-$C_{30}$ substituted or unsubstituted alkylamino group or $C_6$-$C_{30}$ substituted or unsubstituted arylamino group. Examples of the amino group include amino group, methylamino group, dimethylamino group, anilino group, N-methyl-anilino group, diphenylamino group, hydroxyethylamino group, carboxyethylamino group, sulfoethylamino group, 3,5-dicarboxyanilino group, and 4-quinolylamino group.

The acrylamino group represented by $R^1$, $R^2$, $R^3$ and $R^4$ is preferably formylamino group, $C_1$-$C_{30}$ substituted or unsubstituted alkylcarbonylamino group or $C_6$-$C_{30}$ substituted or unsubstituted arylcarbonylamino group. Examples of the acylamino group include formylamino group, acetylamino group, pivaloylamino group, lauroylamino group, benzoylamino group, and 3,4,5-tri-n-octyloxyphenylcarbonylamino group.

The aminocarbonylamino group represented by $R^1$, $R^2$, $R^3$ and $R^4$ is preferably a $C_1$-$C_{30}$ substituted or unsubstituted aminocarbonylamino group. Examples of the aminocarbonylamino group include carbamoylamino group, N,N-dimethylaminocarbonylamino group, N,N-diethylaminocarbonylamino group, and morpholinocarbonylamino group. The term "amino" as used in the aminocarbonyl group has the same meaning as the term "amino" in the aforementioned amino group.

The alkoxycarbonylamino group represented by $R^1$, $R^2$, $R^3$ and $R^4$ is preferably a $C_2$-$C_{30}$ substituted or unsubstituted alkoxycarbonylamino group. Examples of the alkoxycarbonylamino group include methoxycarbonylamino group, ethoxycarbonylamino group, tert-butoxycarbonylamino group, n-octadecyloxy carbonylamino group, and N-methyl-methoxycarbonylamino group.

The aryloxycarbonylamino group represented by $R^1$, $R^2$, $R^3$ and $R^4$ is preferably a $C_7$-$C_{30}$ substituted or unsubstituted aryloxycarbonylamino group. Examples of the aryloxycarbonylamino group include phenoxycarbonyl amino group, p-chlorophenoxycarbonylamino group, and m-n-octyloxyphenoxycarbonylamino group.

The sulfamoylamino group represented by $R^1$, $R^2$, $R^3$ and $R^4$ is preferably a $C_0$-$C_{30}$ substituted or unsubstituted sulfamoylamino group. Examples of the sulfamoylamino group include sulfamoylamino group, N,N-dimethylamino sulfonylamino group, and N-n-octylaminosulfonylamino group.

The alkylsulfonylamino or arylsulfonylamino group represented by $R^1$, $R^2$, $R^3$ and $R^4$ is preferably a $C_1$-$C_{30}$ substituted or unsubstituted alkylsulfonylamino group or $C_6$-$C_{30}$ substituted or unsubstituted arylsulfonylamino group. Examples of the alkylsulfonylamino group and arylsulfonylamino group include methylsulfonylamino group, butylsulfonylamino group, phenylsulfonylamino group, 2,3,5-trichlorophenylsulfonylamino group, and p-methylphenylsulfonylamino group.

The alkylthio group represented by $R^1$, $R^2$, $R^3$ and $R^4$ is preferably a $C_1$-$C_{30}$ substituted or unsubstituted alkylthio group. Examples of the alkylthio group include methylthio group, ethylthio group, and n-hexadecylthio group.

The sulfamoyl group represented by $R^1$, $R^2$, $R^3$ and $R^4$ is preferably a $C_0$-$C_{30}$ substituted or unsubstituted sulfamoyl group. Examples of the sulfamoyl group include N-ethylsulfamoyl group, N-(3-dodecyloxypropyl)sulfamoyl group, N,N-dimethylsulfamoyl group, N-acetylsulfamoyl group, N-benzoylsulfamoyl group, and N—(N'-phenylcarbamoyl)-sulfamoyl group.

The alkylsulfinyl or arylsulfinyl group represented by $R^1$, $R^2$, $R^3$ and $R^4$ is preferably a $C_1$-$C_{30}$ substituted or unsubstituted alkylsulfinyl group or $C_6$-$C_{30}$ substituted or unsubstituted arylsulfinyl group. Examples of the alkylsulfinyl or arylsulfinyl group include methylsulfinyl group, ethylsulfinyl group, phenylsulfinyl group, and p-methylphenylsulfinyl group.

The alkylsulfonyl or arylsulfonyl group represented by $R^1$, $R^2$, $R^3$ and $R^4$ is preferably a $C_1$-$C_{30}$ substituted or unsubstituted alkylsulfonyl group or $C_6$-$C_{30}$ arylsulfonyl group. Examples of the alkylsulfonyl or arylsulfonyl group include methylsulfonyl group, ethylsulfonyl group, phenylsulfonyl group, and p-toluenesulfonyl group.

The acyl group represented by $R^1$, $R^2$, $R^3$ and $R^4$ is preferably a formyl group, $C_2$-$C_{30}$ substituted or unsubstituted alkylcarbonyl group, $C_7$-$C_{30}$ substituted or unsubstituted arylcarbonyl group or $C_4$-$C_{30}$ substituted or unsubstituted heterocyclic carbonyl group connected to carbonyl group via carbon atom. Examples of the acyl group include acetyl group, pivaloyl group, 2-chloroacetyl group, stearoyl group, benzoyl group, p-n-octyloxyphenylcarbonyl group, 2-pyridylcarbonyl group, and 2-furylcarbonyl group.

The aryloxycarbonyl group represented by $R^1$, $R^2$, $R^3$ and $R^4$ is preferably a $C_7$-$C_{30}$ substituted or unsubstituted aryloxycarbonyl group. Examples of the aryloxycarbonyl group include phenoxycarbonyl group, o-chlorophenoxy carbonyl group, m-nitrophenoxycarbonyl group, and p-tert-butylphenoxycarbonyl group.

The alkoxycarbonyl group represented by $R^1$, $R^2$, $R^3$ and $R^4$ is preferably a $C_2$-$C_{30}$ substituted or unsubstituted alkoxycarbonyl group. Examples of the alkoxycarbonyl group include methoxycarbonyl group, ethoxycarbonyl group, tert-butoxycarbonyl group, and n-octadecyloxycarbonyl group.

The carbamoyl group represented by $R^1$, $R^2$, $R^3$ and $R^4$ is preferably a $C_1$-$C_{30}$ substituted or unsubstituted carbamoyl group. Examples of the carbamoyl group include carbamoyl group, N-methylcarbamoyl group, N,N-dimethylcarbamoyl group, N, N-di-n-octylcarbamoyl group, and N-(methylsulfonyl)carbamoyl group.

Examples of the arylazo or heterocyclic azo group represented by $R^1$, $R^2$, $R^3$ and $R^4$ include phenylazo group, 4-methoxyphenylazo group, 4-pivaloylaminophenylazo group, and 2-hydroxy-4-propanoylphenylazo group.

Examples of the imide group represented by $R^1$, $R^2$, $R^3$ and $R^4$ include N-succinimide group, and N-phthalimide group.

$R^1$ is preferably a hydrogen atom, substituted or unsubstituted alkyl group, substituted or unsubstituted alkenyl group, substituted or unsubstituted aryl group, substituted or unsubstituted heterocyclic group, substituted or unsubstituted acylamino group, substituted or unsubstituted aminocarbonylamino group, substituted or unsubstituted alkoxycarbonylamino group or substituted or unsubstituted amino group, more preferably a hydrogen atom, substituted or unsubstituted alkyl group or substituted or unsubstituted aryl group.

$R^2$ is preferably a hydrogen atom, substituted or unsubstituted alkyl group, substituted or unsubstituted alkenyl group, substituted or unsubstituted aryl group, substituted or unsubstituted heterocyclic group or substituted or unsubstituted acyl group, more preferably a hydrogen atom, substituted or unsubstituted alkyl group, substituted or unsubstituted aryl group or substituted or unsubstituted heterocyclic group.

$R^3$ and $R^4$ each independently are preferably a hydrogen atom, substituted or unsubstituted alkyl group, substituted or unsubstituted alkenyl group, substituted or unsubstituted aryl group, substituted or unsubstituted heterocyclic group or substituted or unsubstituted acyl group, more preferably a hydrogen atom or substituted or unsubstituted alkyl group.

Het is preferably a heterocyclic group selected from the aforementioned group 1.

In the structural formulae of the group 1, $R^{11}$, $R^{12}$, $R^{13}$ and $R^{14}$ each independently represent a hydrogen atom or substituent. Examples of the substituent include those exemplified with reference to $R^1$ to $R^4$.

$R^{11}$ is preferably a hydrogen atom, substituted or unsubstituted alkyl group, substituted or unsubstituted aryl group or substituted or unsubstituted heterocyclic group, more preferably a substituted or unsubstituted alkyl group or substituted or unsubstituted aryl group.

$R^{12}$, $R^{13}$ and $R^{14}$ each independently are preferably a hydrogen atom, substituted or unsubstituted alkyl group, substituted or unsubstituted alkenyl group, substituted or unsubstituted aryl group, substituted or unsubstituted heterocyclic group, substituted or unsubstituted acyl group, cyano group, carbamoyl group or alkoxycarbonyl group, more preferably a hydrogen atom, substituted or unsubstituted alkyl group, substituted or unsubstituted aryl group, substituted or unsubstituted heterocyclic group or cyano group.

Het is more preferably a heterocyclic group selected from the aforementioned group 2.

In the structural formulae of the group 2, $R^{11}$, $R^{12}$ and $R^{13}$ have the same meaning as $R^{11}$, $R^{12}$ and $R^{13}$ in the group 1, respectively. Preferred examples of $R^{11}$, $R^{12}$ and $R^{13}$ are the same as exemplified with reference to the group 1.

Het is even more preferably a heterocyclic group selected from the aforementioned group 3.

In the structural formulae of the group 3, $R^{11}$, $R^{12}$ and $R^{13}$ have the same meaning as $R^{11}$, $R^{12}$ and $R^{13}$ in the groups 1 and 2, respectively. Preferred examples of $R^{11}$, $R^{12}$ and $R^{13}$ are the same as exemplified with reference to the groups 1 and 2.

Referring to the preferred combination of substituents on the dye represented by the formula (1) of the invention, a compound at least one of the various substituents on which is the aforementioned preferred group is preferred. More desirable is a compound more of the various substituents on which are the aforementioned preferred groups. Most desirable is a compound all of the various substituents on which are the aforementioned preferred groups. Referring further to the preferred combination of substituents, $R^1$ is a $C_1$-$C_6$ unsubstituted alkyl group, $R^2$ is a $C_1$-$C_6$ substituted or unsubstituted alkyl group or substituted or unsubstituted aryl group, $R^3$ and $R^4$ each are a hydrogen atom, and Het is a group represented by the group 2, most preferably a dye represented by the formula (2) or (3).

The azo dye represented by the formula (2) or (3) will be further described hereinafter.

The Hammett's substituent constant $\sigma_p$ as used herein will be further described hereinafter.

Hammett's rule is an empirical rule which L. P. Hammett proposed in 1935 to quantitatively discuss the effect of substituents on the reaction or equilibrium of benzene derivatives, and the validity of this empirical rule has been widely accepted today. Substituent constants required in Hammett's rule are $\sigma_p$ value and $\sigma_m$ value, and these values are found in many general literatures. For the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96-103, 1979 (Nankodo). In the invention, these substituents are defined or described by Hammett's substituent constant $\sigma_p$, but this doesn't mean that the known values found in the aforementioned literatures are not limited to certain substituents and it goes without saying that even if the values are unknown in literatures, they contain substituents which may fall within the defined range when measured according to Hammett's rule. Further, the compounds of the formulae of the invention contain those which are not benzene derivatives, and as a measure for indicating the electron effect of substituents there is used $\sigma_p$ value regardless of substitution position. In the invention, $\sigma_p$ value is used in this sense.

EWG represents an electron-withdrawing group having a Hammett's substituent constant $\sigma_p$ value of 0 or more. EWG is preferably an electron-withdrawing group having a $\sigma_p$ value of 0.45 or more, particularly preferably 0.60 or more. The upper limit of $\sigma_p$ value is preferably 1.0 or less. Examples of the electron-withdrawing group having a $\sigma_p$ value of 0.60 or more include nitro groups, cyano groups, methanesulfonyl groups, trifluoromethanesulfonyl groups, trifluoroacetyl groups, dimethylaminosulfonyl groups, and sulfamoyl groups. Examples of the electron-withdrawing group having a $\sigma_p$ value of 0.45 or more include alkoxycarbonyl groups, acyl groups, and carboxyl groups. Examples of the electron-withdrawing group having a $\sigma_p$ value of 0.30 or more include sulfo groups, and carbamoyl groups. Preferred among these electron-withdrawing groups are cyano groups, carboxyl groups, alkoxycarbonyl groups, and carbamoyl groups, more preferably cyano groups, alkoxycarbonyl groups, and carbamoyl groups, most preferably cyano groups and carbamoyl groups.

$R^1$, $R^2$, $R^3$ and $R^4$ in the formulae (2) and (3) have the same meaning as $R^1$, $R^2$, $R^3$ and $R^4$ in the formula (1), respectively. Preferred examples of $R^1$, $R^2$, $R^3$ and $R^4$ are the same as exemplified with reference to the formula (1).

$R^5$ and $R^8$ each independently represent a hydrogen atom or substituent. Specific examples of the substituent include those exemplified with reference to $R^1$, $R^2$, $R^3$ and $R^4$.

$R^5$ and $R^6$ each independently are preferably a hydrogen atom, substituted or unsubstituted alkyl group, substituted or unsubstituted alkenyl group, substituted or unsubstituted aryl group, substituted or unsubstituted heterocyclic group or acyl group, more preferably a hydrogen atom, substituted or unsubstituted alkyl group, substituted or unsubstituted aryl group or substituted or unsubstituted heterocyclic group.

Referring to the preferred combination of substituents on the dye represented by the formula (2), a compound at least one of the various substituents on which is the aforementioned preferred group is preferred. More desirable is a compound more of the various substituents on which are the aforementioned preferred groups. Most desirable is a compound all of the various substituents on which are the aforementioned preferred groups. Referring further to the preferred combination of substituents, $R^1$ is a $C_1$-$C_6$ unsubstituted alkyl group, $R^2$ is a $C_1$-$C_6$ substituted or unsubstituted alkyl group or substituted or unsubstituted aryl group, $R^3$ and $R^4$ each are a hydrogen atom, $R^5$ is a $C_1$-$C_6$ substituted or unsubstituted alkyl group, $R^6$ is a $C_1$-$C_6$ substituted or unsubstituted alkyl group or a substituted or unsubstituted aryl group, and EWG is a carbamoyl group or cyano group. More preferably, $R^1$ is a $C_1$-$C_6$ unsubstituted alkyl group, $R^2$ is a $C_1$-$C_6$ substituted or unsubstituted alkyl group, R3 and R4 each are a hydrogen atom, $R^5$ is a $C_1$-$C_6$ substituted or unsubstituted alkyl group, $R^6$ is a $C_1$-$C_6$ substituted or unsubstituted alkyl group, and EWG is a cyano group.

The molecular weight of the compound represented by the formula (1) is preferably 500 or less, more preferably 450 or less from the standpoint of heat diffusibility.

The azo dye represented by the formula (4) or (5) of the invention will be further described hereinafter.

The 5-aminopyrazolylazopyrazole dye represented by the formula (4) or (5) is a dye free of aryl group and heteroaryl group as substituent. No dyes having these characteristics have been known to date. These dyes are excellent in solubility as compared with 5-aminopyrazolylazopyrazole dyes having aryl group or heteroaryl group as a substituent. Thus, it is thought that these dyes can be used for other purposes (e.g., ink solution) in addition to the aforementioned ink sheet for heat-sensitive transfer recording material.

In the formula (4) or (5), $R^A$, $R^B$, $R^C$ and $R^D$ each independently represent a hydrogen atom or substituted or unsubstituted $C_1$-$C_6$ alkyl group, preferably a hydrogen atom or $C_1$-$C_6$ unsubstituted alkyl group, more preferably $C_1$-$C_4$ unsubstituted alkyl group. Branched alkyl groups are particularly preferably included.

Referring to the preferred combination of substituents on the dye represented by the formula (4) or (5) of the invention, a compound at least one of the various substituents on which is the aforementioned preferred group is preferred. More desirable is a compound more of the various substituents on which are the aforementioned preferred groups. Most desirable is a compound all of the various substituents on which are the aforementioned preferred groups. Referring further to the preferred combination of substituents, $R^A$ is a $C_1$-$C_4$ unsubstituted alkyl group, $R^B$ is a $C_1$-$C_4$ unsubstituted alkyl group, $R^C$ is a $C_1$-$C_4$ unsubstituted alkyl group, and $R^D$ is a $C_1$-$C_4$ unsubstituted alkyl group. More preferably, $R^A$ is a $C_3$-$C_4$ unsubstituted branched alkyl group, $R^B$ is a $C_1$-$C_4$ unsubstituted alkyl group, $R^C$ is a $C_1$-$C_4$ unsubstituted alkyl group, and $R^D$ is a $C_1$-$C_4$ unsubstituted alkyl group.

Specific examples of the azo dye represented by the formula (1) of the invention will be given below, but the azo dye of the formula (1) which can be used in the invention is not limited thereto. In the following specific examples, Ph represents a phenyl group ($—C_6H_5$).

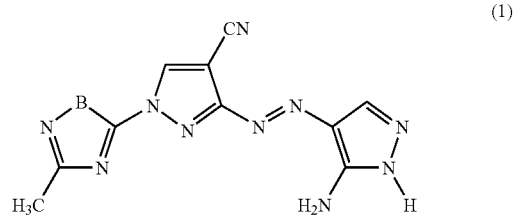

(1)

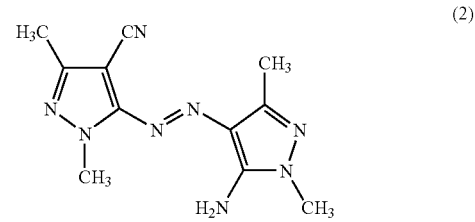

(2)

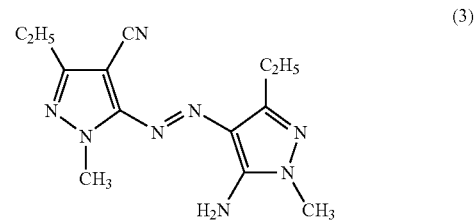

(3)

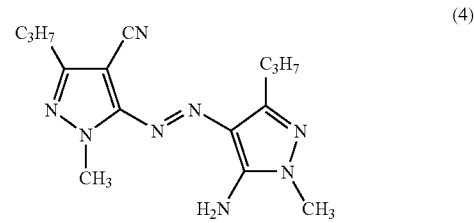

(4)

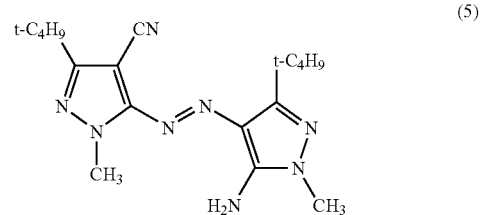

(5)

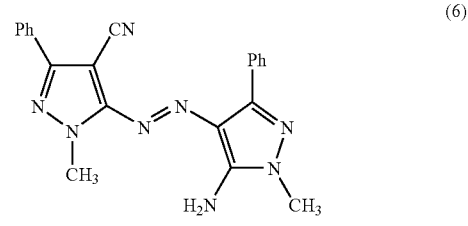

(6)

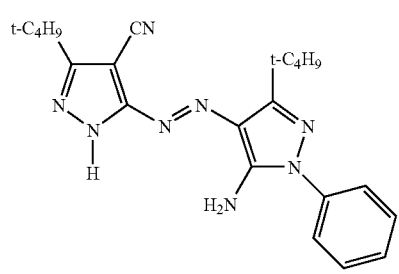 (7)
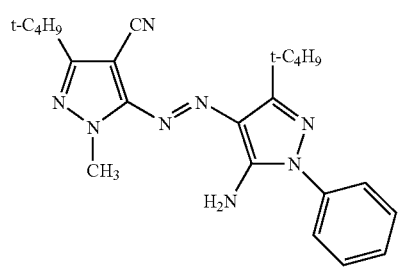 (8)
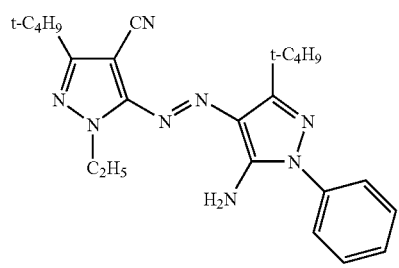 (9)
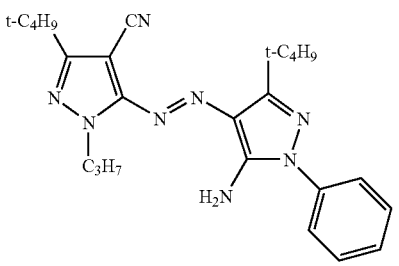 (10)
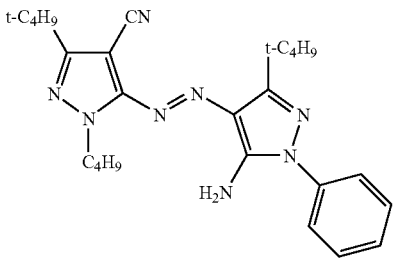 (11)
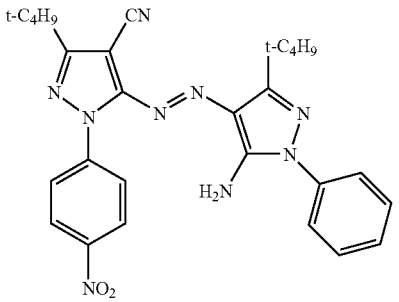 (12)
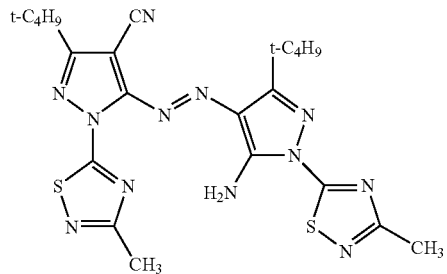 (13)
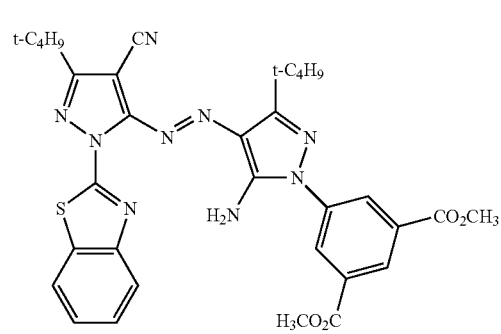 (14)
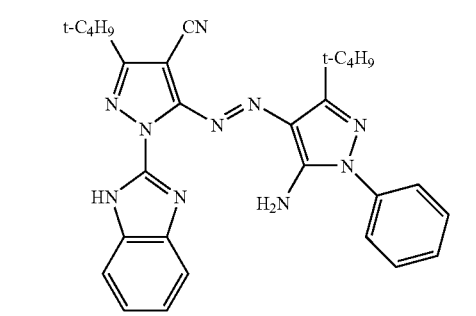 (15)
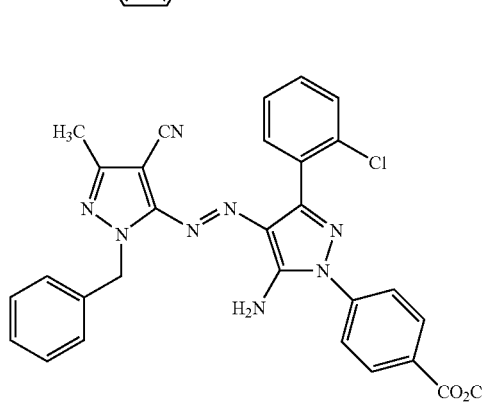 (16)
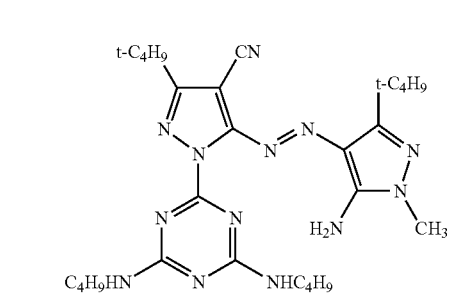 (17)

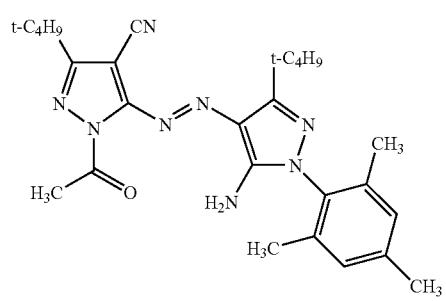
(18)
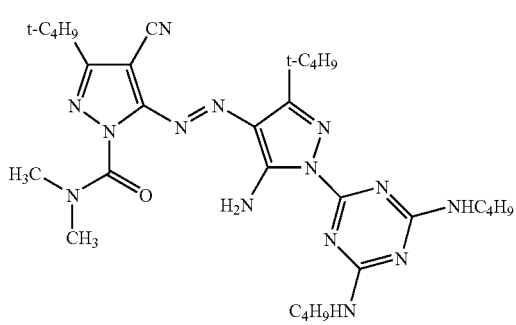
(19)
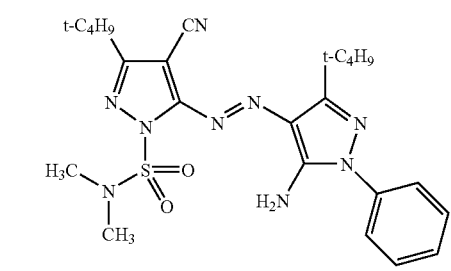
(20)
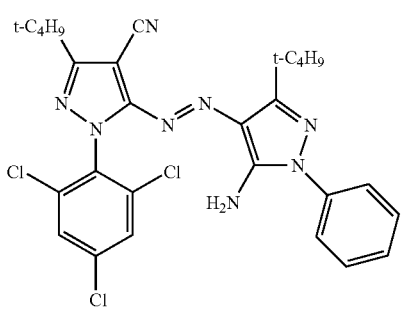
(21)
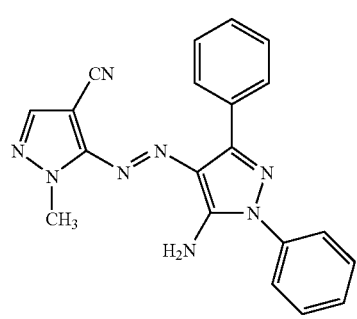
(22)
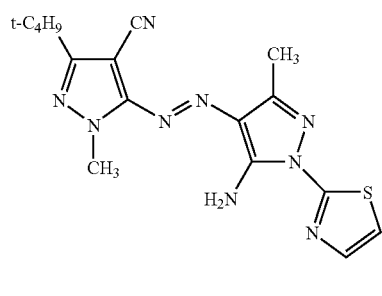
(23)
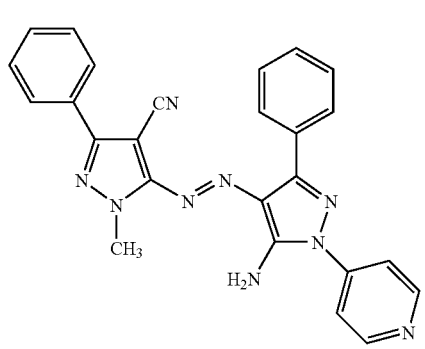
(24)
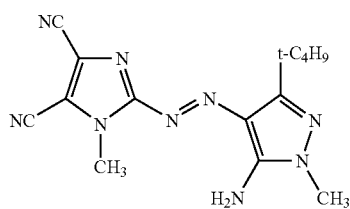
(25)
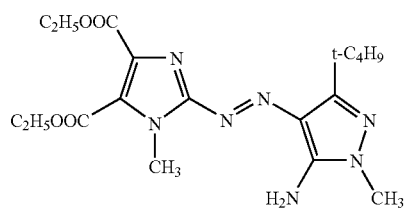
(26)
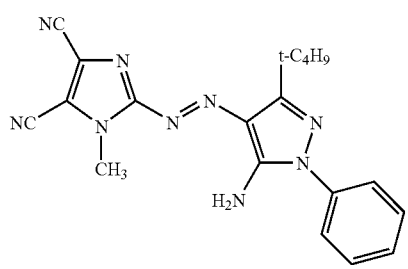
(27)
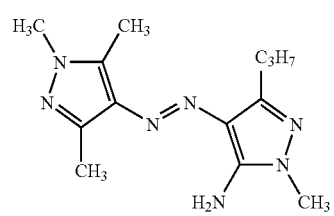
(28)

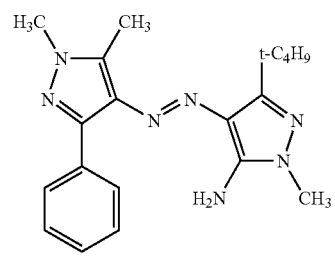 (29)
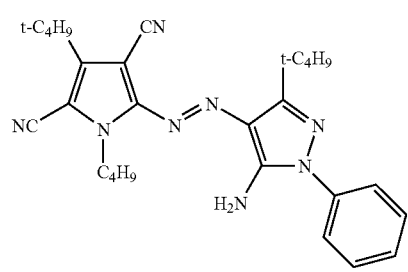 (35)
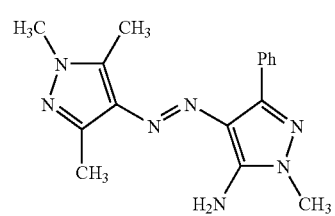 (30)
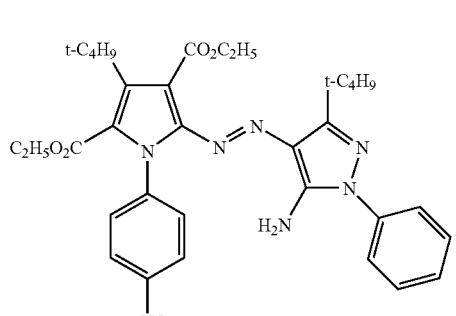 (36)
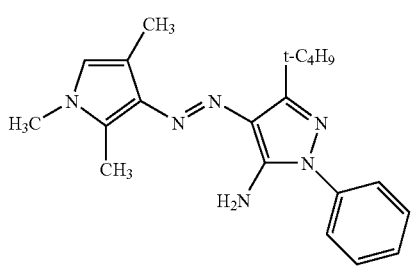 (31)
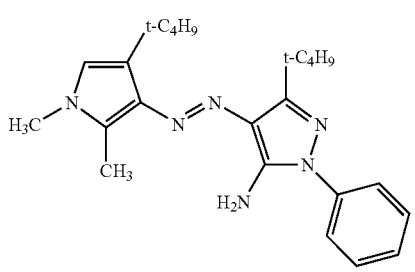 (32)
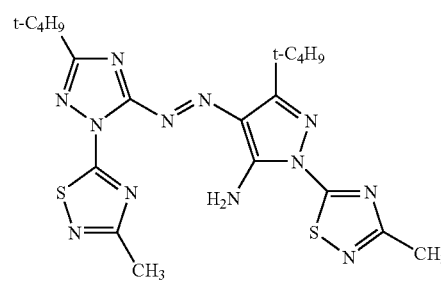 (37)
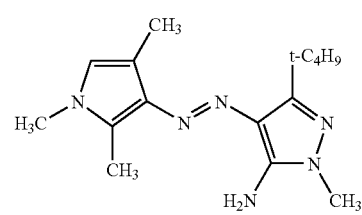 (33)
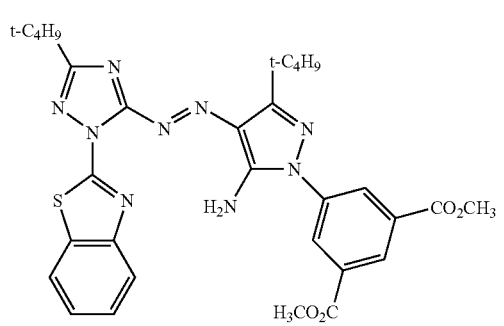 (38)
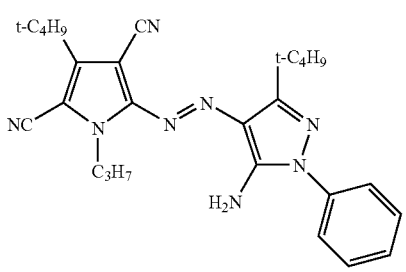 (34)
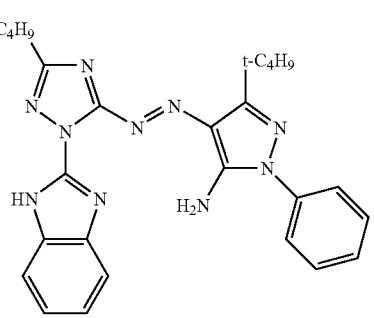 (39)

(40)
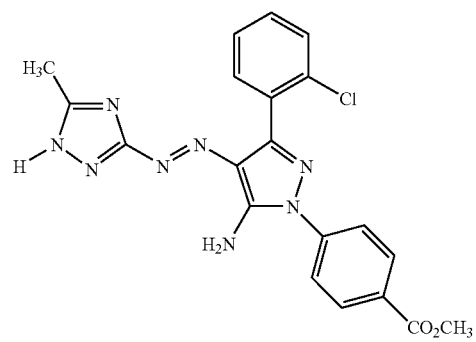
(41)
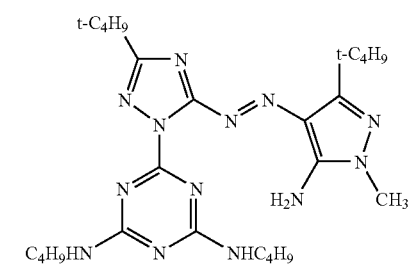
(42)
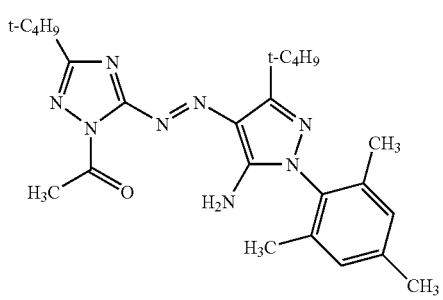
(43)
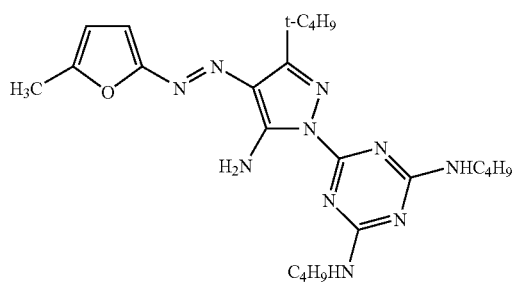
(44)
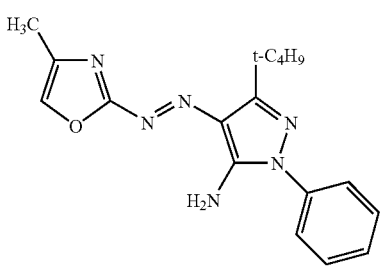
(45)
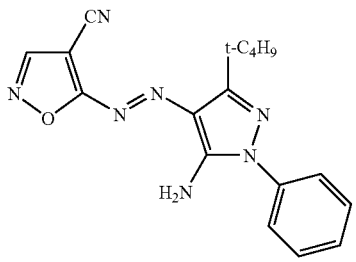
(46)
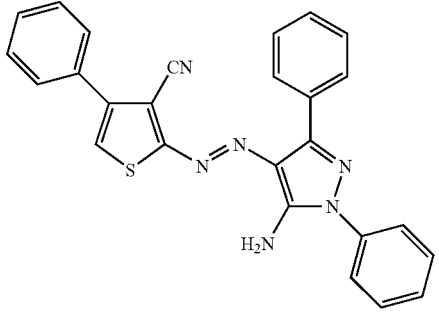
(47)
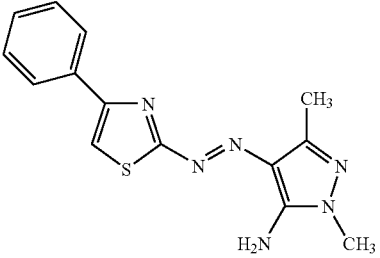
(48)
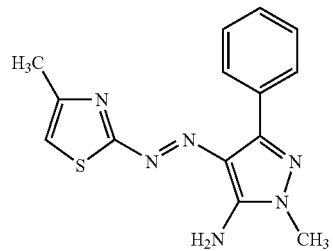
Among these specific examples, the exemplary compounds (2) to (5) are also specific examples of the azo dye represented by the formula (4) or (5).
Specific examples of other azo dyes represented by the formula (4) or (5) of the invention will be given below, but the azo dye represented by the formula (4) or (5) of the invention is not limited thereto.
(49)
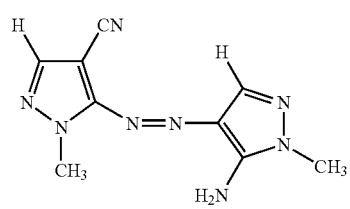

-continued

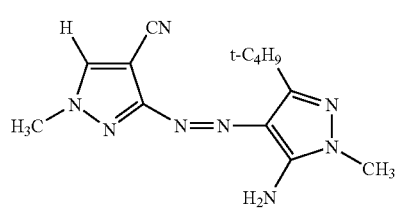 (66)
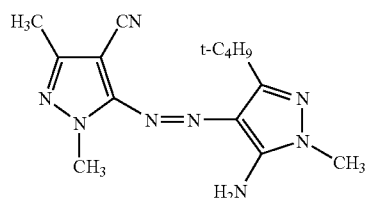 (67)
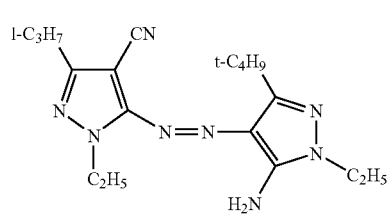 (68)
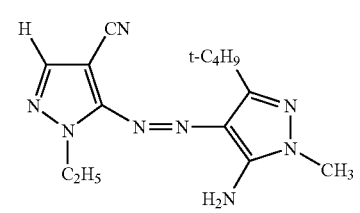 (69)
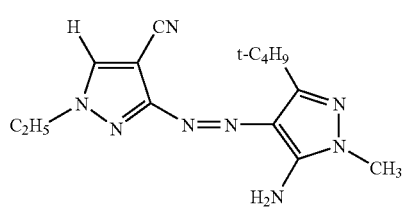 (70)
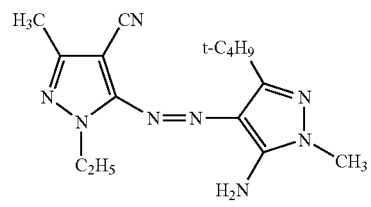 (71)
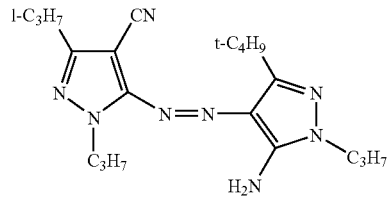 (72)
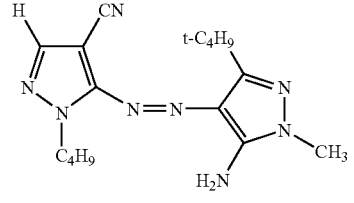 (73)
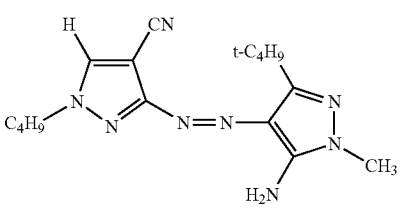 (74)
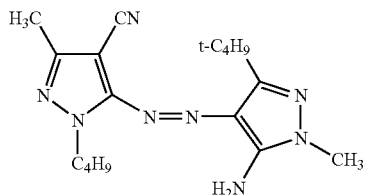 (75)
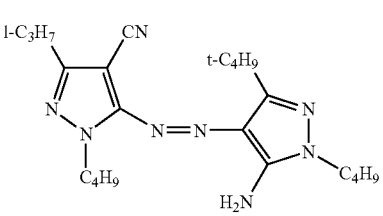 (76)
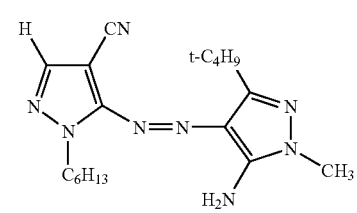 (77)
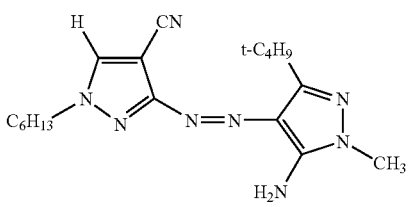 (78)
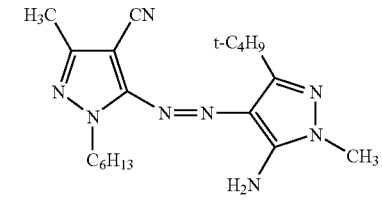 (79)
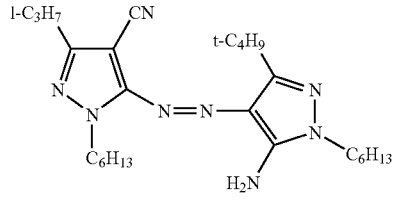 (80)
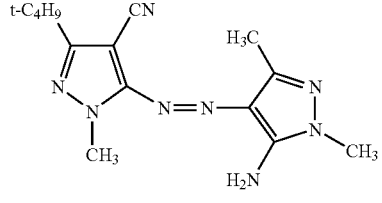 (81)

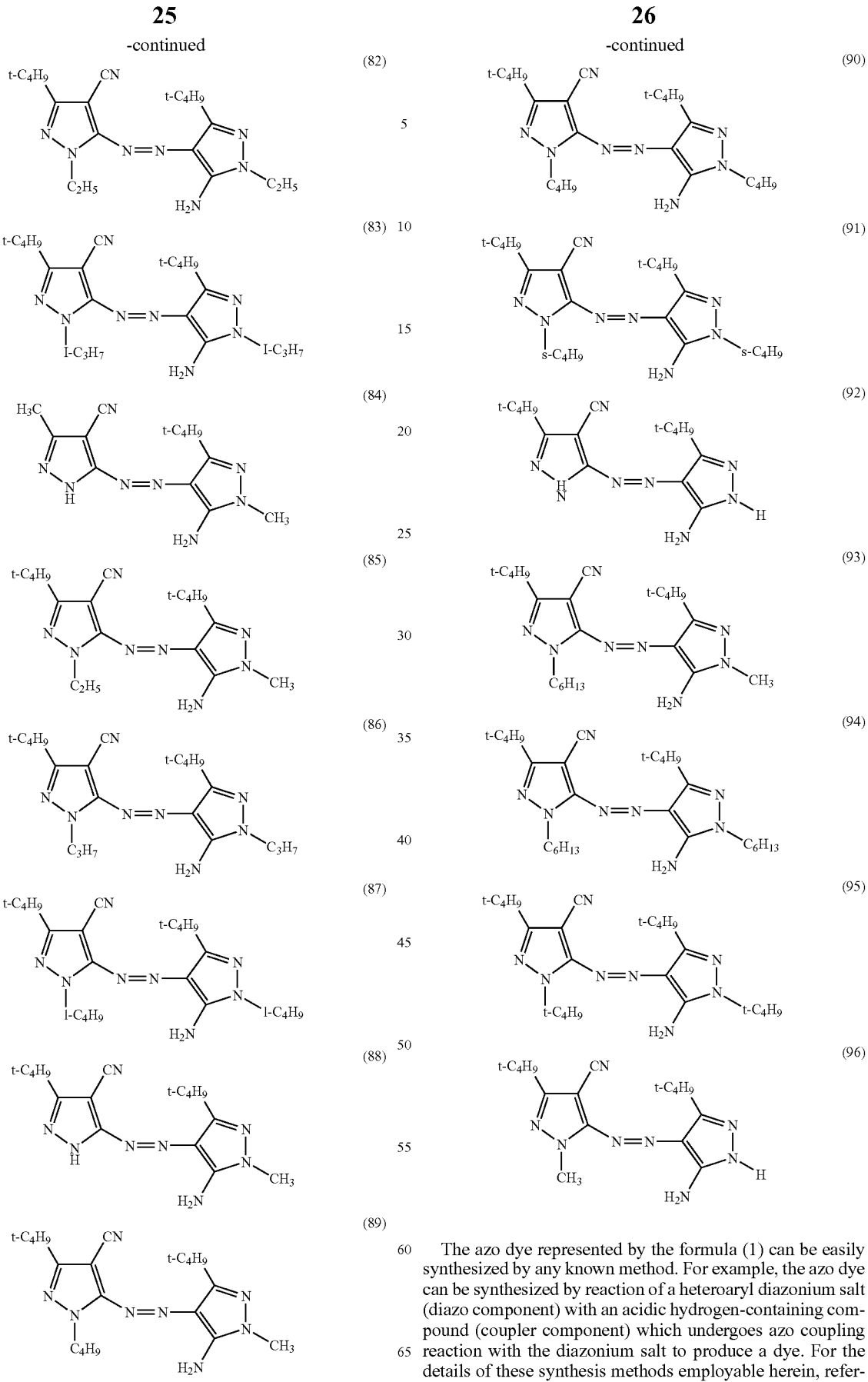

The azo dye represented by the formula (1) can be easily synthesized by any known method. For example, the azo dye can be synthesized by reaction of a heteroaryl diazonium salt (diazo component) with an acidic hydrogen-containing compound (coupler component) which undergoes azo coupling reaction with the diazonium salt to produce a dye. For the details of these synthesis methods employable herein, reference can be made to HELV. CHIM. ACTA, 68(1985), page 1,427, RUSS. CHEM. BI, 52, 7(2003), page 1,600, COLLECT CZECH. CHEM. COMMUN., 50, 3 (1985), page 658, and J. ORG. CHEM. 48, 14(1983), page 2,330. The azo dye can be synthesized also according to the following synthesis examples 1 to 4.

The ink sheet for heat-sensitive transfer recording material of the invention is characterized in that it contains an azo dye represented by the formula (1). An ink sheet for heat-sensitive transfer recording material normally has a dye-providing layer formed on a support. In the invention, the dye-providing layer comprises an azo dye represented by the formula (1) incorporated therein. The ink sheet for heat-sensitive transfer recording material of the invention can be produced by dissolving an azo dye represented by the formula (1) in a solvent with a binder or finely dispersing the azo dye in the solvent to prepare an ink solution, spreading the ink solution over a support, and then properly drying the ink coat to form a dye-providing layer.

As the support to be used in the ink sheet for heat-sensitive transfer recording material of the invention there may be used one properly selected from materials which have been heretofore used as a support for ink sheet. For example, the material described in JP-A-7-137466, paragraph [0050], can be used to advantage. The thickness of the support is preferably from 2 µm to 30 µm.

The kind of the binder resin to be incorporated in the dye-providing layer of the ink sheet for heat-sensitive transfer recording material of the invention is not specifically limited so far as it is so heat-resistant that when heated, it doesn't prevent the dye from moving to the image-receiving sheet. Preferred examples of the binder resin employable herein include those disclosed in JP-A-7-137466, paragraph [0049]. As the solvent for forming the dye-providing layer there may be used one properly selected from known solvents. Preferred examples of the solvent employable herein include those disclosed in JP-A-7-137466.

The content of the azo dye represented by the formula (1) in the dye-providing layer is preferably from 0.03 to 1.0 g/m², more preferably from 0.1 to 0.6 g/m². The thickness of the dye-providing layer is preferably from 0.2 µm to 5 µm, more preferably from 0.4 µm to 2 µm.

The ink sheet for heat-sensitive transfer recording material of the invention may have layers other than dye-providing layer so far as they don't excessively impair the effect of the invention. For example, an interlayer may be provided interposed between the support and the dye-providing layer. A back layer may be provided on the side of the support opposite the dye-providing layer (hereinafter occasionally referred to as "back surface"). Examples of the interlayer include undercoating layer, and anti-diffusion layer for preventing the diffusion of the dye toward the support (hydrophilic barrier layer). As the back layer there may be used a heat-resistant slip layer. Such a heat-resistant slip layer can prevent from the thermal head from being bonded to the ink sheet.

In order to apply the invention to heat-sensitive transfer recording material allowing full-color image recording, a cyan ink sheet containing a heat-diffusible cyan dye capable of forming a cyan image, a magenta ink sheet containing a heat-diffusible magenta dye capable of forming a magenta image and a yellow ink sheet containing a heat-diffusible yellow dye capable of forming a yellow image are preferably spread successively over a support. If necessary, an ink sheet containing a black image-forming material may be further formed.

As the cyan ink sheet containing a heat-diffusible cyan dye capable of forming a cyan image there is preferably used one disclosed in JP-A-3-103477, JP-A-3-150194, etc.

As the magenta ink sheet containing a heat-diffusible magenta dye capable of forming a magenta image there is preferably used one disclosed in JP-A-5-286268, etc.

In order to effect heat-sensitive transfer recording using the ink sheet for heat-sensitive transfer recording material of the invention, a heating means such as thermal head and an image-receiving sheet are used in combination. In other words, heat energy is applied from the thermal head to the ink sheet according to an image recording signal. The dye at the area to which the heat energy has been applied moves to the image-receiving sheet where it is then fixed to effect image recording. As the configuration and materials of the image-receiving sheet there are preferably used those disclosed in JP-A-7-137466, paragraph [0056]-[0074].

When the ink sheet for heat-sensitive transfer recording material of the invention is used to effect heat-sensitive transfer recording, the image thus formed exhibits a sharp hue and an excellent lightfastness.

The ink sheet for heat-sensitive transfer recording material of the invention can be loaded in ink cartridges. As the configuration and loading method of ink cartridge there can be used those which have heretofore been employed in the art of heat-sensitive transfer recording. In some detail, ink cartridge techniques disclosed in JP-UM-A-63-161851, JP-UM-A-63-161851, JP-UM-A-1-101864, etc. can be applied also to the invention. Particularly preferred among these ink cartridge techniques are those disclosed in JP-UM-A-1-101864.

EXAMPLES

The characteristics of the present invention will be further described in the following examples. The materials, added amounts, proportions, treatment conditions, procedural orders, etc. described hereinafter may be properly changed so far as they fall within the essence of the present invention. Accordingly, the scope of the present invention should not be construed as being limited to the following examples.

Synthesis Example 1

Synthesis of Exemplary Compound (7)

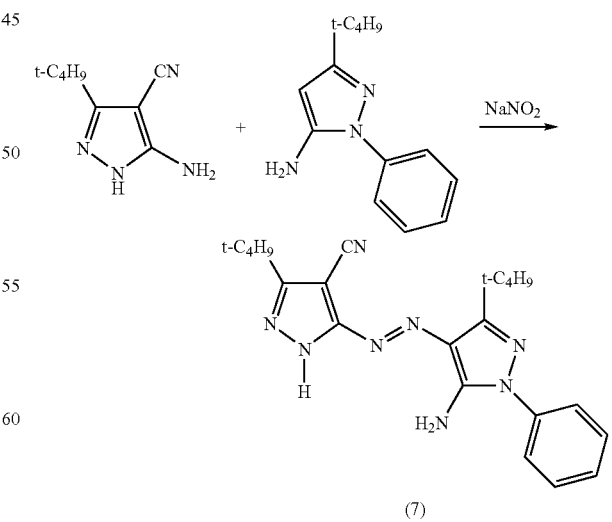

8.21 g (0.05 mol) of 5-amino-3-tert-butylpyrazole-4-carbonitrile, 15.4 ml of concentrated sulfuric acid, 10 ml of acetic acid and 15 ml of propionic acid were stirred at an internal temperature of from 0° C. to 5° C. To the mixture was then added dropwise a mixture of 3.45 g (0.05 mol) of sodium nitrite and 7.3 ml of water at an internal temperature of 5° C. The mixture was then stirred at an internal temperature of from 0° C. to 5° C. for 30 minutes. The diazonium salt solution thus obtained was then added dropwise to 100 ml of an acetonitrile solution of 10.7 g (0.05 mol) of 5-amino-3-tert-butyl-1-phenylpyrazole at an internal temperature of 10° C. or less. After the dropwise addition of the diazonium salt solution, the reaction solution was then stirred as it was for 30 minutes. The azo dye crystallized from the reaction system was suction-filtered, spray-washed with water and then with acetonitrile, and then dried at 60° C. overnight to obtain Exemplary Compound (7). The yield was 12.9 g (66%). Exemplary Compound (7) thus obtained showed λmax of 421 nm (as measured in ethyl acetate solution).

Synthesis Example 2

Synthesis of Exemplary Compound (8)

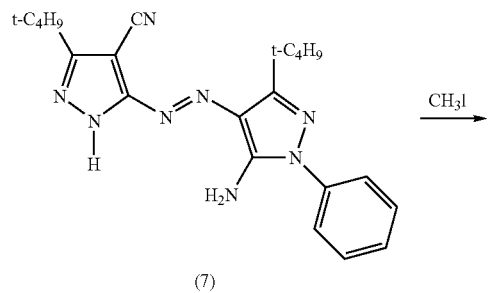

(7)

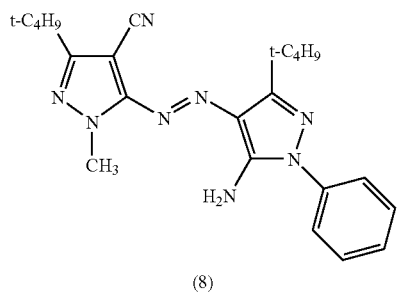

(8)

To 2.50 g (0.0064 mol) of Exemplary Compound (7) were added 10 ml of dimethylacetamide, 0.88 g (0.0064 mol) of potassium carbonate and 0.40 ml (0.0064 mol) of iodomethane. The mixture was then stirred at room temperature for 60 minutes. After the termination of the reaction, to the reaction mixture was then added 50 ml of saturated aqueous solution of sodium chloride. The reaction mixture was then extracted with 50 ml of ethyl acetate. The resulting organic phase was dried over anhydrous salt cake, and then isolated by column chromatography (filler: silica gel; developing solvent: ⅔ mixture of ethyl acetate and hexane) to obtain Exemplary Compound (8). The yield was 1.03 g (40%). Exemplary Compound (8) thus obtained showed λmax of 432 nm (as measured in ethyl acetate solution).

Synthesis Example 3

Synthesis of Exemplary Compound (92)

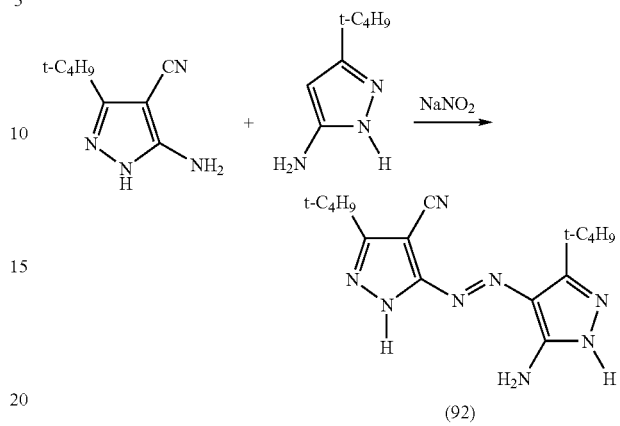

(92)

8.21 g (0.05 mol) of 5-amino-3-tert-butylpyrazole-4-carbonitrile, 15.4 ml of concentrated sulfuric acid, 10 ml of acetic acid and 15 ml of propionic acid were stirred at an internal temperature of from 0° C. to 5° C. To the mixture was then added dropwise a mixture of 3.45 g (0.05 mol) of sodium nitrite and 7.3 ml of water at an internal temperature of 5° C. The mixture was then stirred at an internal temperature of from 0° C. to 5° C. for 30 minutes. The diazonium salt solution thus obtained was then added dropwise to 100 ml of an acetonitrile solution of 6.95 g (0.05 mol) of 5-amino-3-tert-butyl-1-phenylpyrazole at an internal temperature of 10° C. or less. After the dropwise addition of the diazonium salt solution, the reaction solution was then stirred as it was for 30 minutes. The azo dye crystallized from the reaction system was suction-filtered, spray-washed with water and then with acetonitrile, and then dried at 60° C. overnight to obtain Exemplary Compound (92). The yield was 13.2 g (84%). Exemplary Compound (92) thus obtained showed λmax of 421 nm (as measured in ethyl acetate solution).

Synthesis Example 4

Synthesis of Exemplary Compound (5)

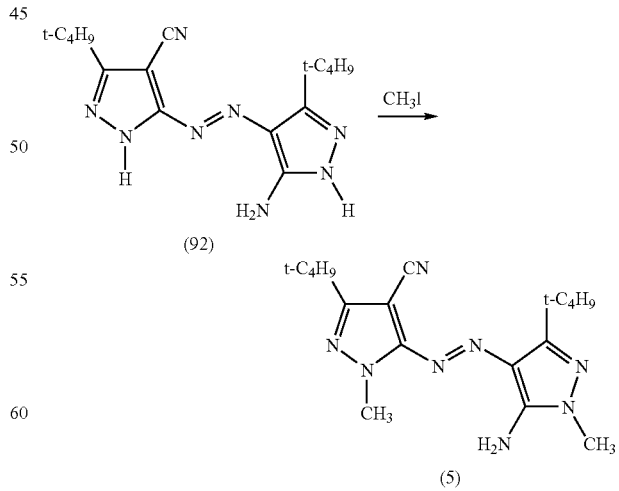

To 2.01 g (0.0064 mol) of Exemplary Compound (92) were added 10 ml of dimethylacetamide, 1.76 g (0.0128 mol) of potassium carbonate and 0.80 ml (0.0128 mol) of iodomethane. The mixture was then stirred at room temperature for 60 minutes. After the termination of the reaction, to the reaction mixture was then added 50 ml of saturated aqueous solution of sodium chloride. The reaction mixture was then extracted with 50 ml of ethyl acetate. The resulting organic phase was dried over anhydrous salt cake, and then isolated by column chromatography (filler: silica gel; developing solvent: ⅔ mixture of ethyl acetate and hexane) to obtain Exemplary Compound (5). The yield was 1.71 g (78%). Exemplary Compound (5) thus obtained showed λmax of 432 nm (as measured in ethyl acetate solution).

Exemplary Compounds (2) to (4) and (49) to (96) can be synthesized according to the aforementioned Synthesis Examples 1 to 4. The maximum absorption wavelength of absorption spectrum of Exemplary Compounds (2) to (4) and (49) to (96) will be set forth in Table 1.

TABLE 1

| Dye | Maximum absorption wavelength (nm) |
|---|---|
| 2 | 432 |
| 3 | 432 |
| 4 | 432 |
| 49 | 433 |
| 50 | 414 |
| 51 | 432 |
| 52 | 416 |
| 53 | 432 |
| 54 | 416 |
| 55 | 432 |
| 56 | 415 |
| 57 | 432 |
| 58 | 412 |
| 59 | 432 |
| 60 | 413 |
| 61 | 433 |
| 62 | 414 |
| 63 | 433 |
| 64 | 415 |
| 65 | 430 |
| 66 | 416 |
| 67 | 432 |
| 68 | 432 |
| 69 | 433 |
| 70 | 434 |
| 71 | 431 |
| 72 | 432 |
| 73 | 432 |
| 74 | 416 |
| 75 | 431 |
| 76 | 432 |
| 77 | 432 |
| 78 | 416 |
| 79 | 431 |
| 80 | 430 |
| 81 | 430 |
| 82 | 432 |
| 83 | 432 |
| 84 | 412 |
| 85 | 432 |
| 86 | 432 |
| 87 | 433 |
| 88 | 422 |
| 89 | 432 |
| 90 | 432 |
| 91 | 433 |
| 93 | 432 |
| 94 | 432 |
| 95 | 433 |
| 96 | 412 |

Example 1

Preparation of Ink Sheet for Heat-Sensitive Transfer Recording Material

As a support there was used a polyester film having a thickness of 6.0 μm (Lumirror (trade name), produced by TORAY INDUSTRIES, INC.) which had been subjected to heat-resistant smoothing treatment by the thermosetting resin (thickness: 1 μm) on the back surface thereof. Using a wire bar coater, the following coating composition for dye-providing layer was then spread over the front surface of the film to a dried thickness of 1 μm to prepare an ink sheet 1.

| (Coating composition for dye-providing layer) | |
|---|---|
| Exemplary Compound (5) | 5.5 parts by mass |
| Polyvinyl butyral resin (S-LEX BX-1 (trade name), produced by SEKISUI CHEMICAL CO., LTD.) | 4.5 parts by mass |
| Methyl ethyl ketone/toluene (1/1) | 90 parts by mass |

Inventive ink sheets 2 to 15 and comparative ink sheet 16 were prepared in the same manner as described above except that Exemplary Compound (5) was replaced by other dyes set forth in Table 1, respectively.

Example 2

Heat-Sensitive Transfer Recording

<Preparation of Image-Receiving Material>
As a support there was used a synthetic paper (YUPO FPG200 (trade name), produced by YUPO CORPORATION; thickness: 200 μm). Using a bar coater, a white interlayer composition and a receiving layer composition having the following formulations were then spread successively over one side of the support. The spread of the white interlayer and the receiving layer after drying were 1.0 g/m² and 4.0 g/m², respectively. These layers were each dried at 110° C. for 30 seconds.

| (White interlayer composition) | |
|---|---|
| Polyester resin (VYLON200 (trade name), produced by TOYOBO CO., LTD.) | 10 parts by mass |
| Fluorescent brightening agent (Uvitex OB (trade name), produced by Ciba Geigy Inc.) | 1 part by mass |
| Titanium oxide | 30 parts by mass |
| Methyl ethyl Ketone/toluene (1/1) | 90 parts by mass |
| (Receiving layer composition) | |
| Vinyl chloride-vinyl acetate resin (Solbine A (trade name), produced by NISSIN CHEMICAL INDUSTRY CO., LTD.) | 100 parts by mass |
| Amino-modified silicone (X22-3050C (trade name), produced by Shin-Etsu Chemical Co., Ltd.) | 5 parts by mass |
| Epoxy-modified silicone (X22-300E (trade name), produced by Shin-Etsu Chemical Co., Ltd.) | 5 parts by mass |
| Methyl ethyl ketone/toluene (1/1) | 400 parts by mass |
| Benzotriazole-based ultraviolet absorber (Tinuvin 900 (trade name), produced by Ciba Specialty Chemicals Co., Ltd.) | 5 parts by mass |

<Image Recording and Evaluation>

The ink sheets 1 to 16 thus obtained were each laminated on the aforementioned image-receiving material in such an arrangement that the dye-providing layer and the image-receiving layer come in contact with each other. Using a thermal head, printing was then made on the back surface of the dye-providing material under the conditions that the output of the thermal head was 0.25 W/dot, the pulse width was from 0.15 to 15 m seconds and the dot density was 6 dots/mm so that the image-receiving layer of the image-receiving material was imagewise dyed with a yellow dye. As a result, a sharp image free of transfer unevenness was recorded. Subsequently, these heat-transfer image-receiving materials which had thus been subjected to image recording were each irradiated with Xe light (1,700 lux) for 14 days to examine the light-stability (light-fastness) of color image. The area showing a status A reflection density of 1.0 was measured for status A reflection density after irradiation. The percent remaining of reflection density per reflection density before irradiation was determined to evaluate the light-stability of color image. The results are set forth in Table 2.

TABLE 2

| Ink sheet | Dye | Lightfastness | Remarks |
|---|---|---|---|
| 1 | 5 | 88 | Inventive |
| 2 | 8 | 89 | Inventive |
| 3 | 11 | 85 | Inventive |
| 4 | 25 | 79 | Inventive |
| 5 | 29 | 74 | Inventive |
| 6 | 32 | 75 | Inventive |
| 7 | 34 | 70 | Inventive |
| 8 | 39 | 80 | Inventive |
| 9 | 43 | 81 | Inventive |
| 10 | 44 | 82 | Inventive |
| 11 | 45 | 79 | Inventive |
| 12 | 48 | 71 | Inventive |
| 13 | 72 | 89 | Inventive |
| 14 | 82 | 88 | Inventive |
| 15 | 91 | 91 | Inventive |
| 16 | Comparative dye 1 | 48 | Comparative |

Comparative Dye 1

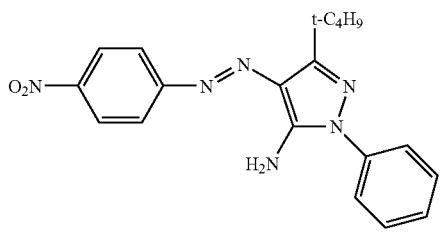

As can be seen in the aforementioned results of image recording test, the image transferred from the ink sheet comprising an azo dye represented by the formula (1) to the image-receiving layer has a sharp hue and exhibits an excellent lightfastness as compared with the case where the comparative dye is used. It was further confirmed that as compared with the comparative dye, the azo dye of the invention undergoes little image bleeding with time under high temperature and humidity conditions and little occurrence of retransfer and exhibits excellent image storage properties.

In accordance with the invention, an ink sheet for heat-sensitive transfer recording material having excellent spectral properties, including sharp absorption, and a high fastness can be provided. Accordingly, the invention can be expected to be effectively used in full-color recording of high quality images and thus has a high industrial applicability.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 051693/2006 filed on Feb. 28, 2006, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An ink sheet for heat-sensitive transfer recording material comprising an azo dye represented by the following formula (1):

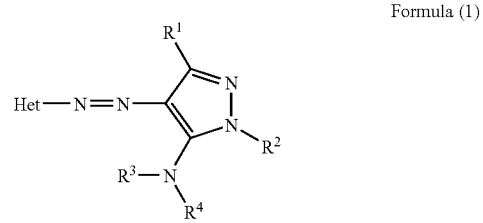

Formula (1)

wherein $R^1$, $R^3$ and $R^4$ each independently represents a hydrogen atom or a substituent; $R^2$ represents a hydrogen atom, a substituted or unsubstituted alkyl group, a substituted or unsubstituted alkenyl group, a substituted or unsubstituted aryl group or a substituted or unsubstituted acyl group; and Het represents a heterocyclic group selected from the following group 1:

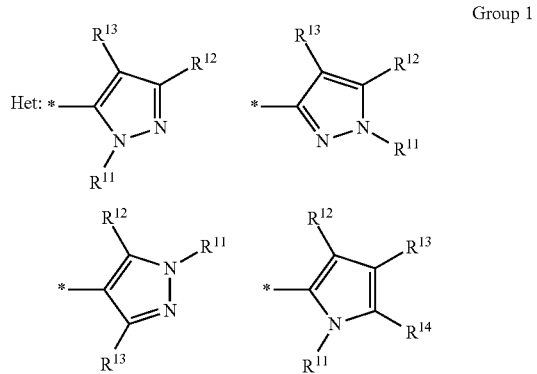

Group 1

-continued

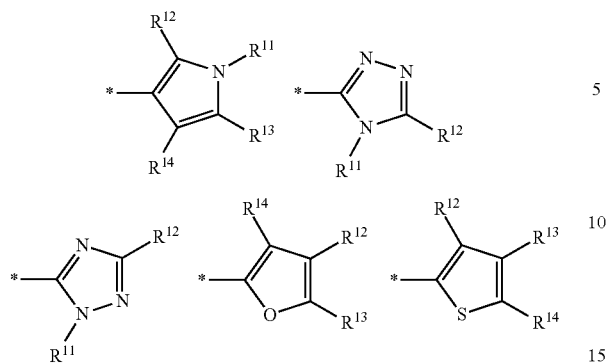

wherein $R^{11}$, $R^{12}$, $R^{13}$ and $R^{14}$ each independently represents a hydrogen atom or a substituent.

2. The ink sheet for heat-sensitive transfer recording material according to claim 1, wherein Het is a heterocyclic group selected from the following group 2:

Group 2

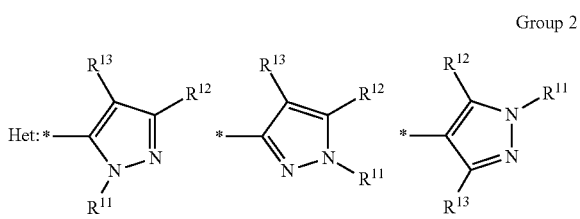

wherein $R^{11}$, $R^{12}$ and $R^{13}$ each independently represents a hydrogen atom or a substituent.

3. The ink sheet for heat-sensitive transfer recording material according to claim 1, wherein Het is a heterocyclic group selected from the following group 3:

Group 3

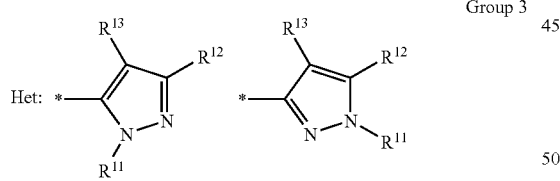

wherein $R^{11}$, $R^{12}$ and $R^{13}$ each independently represents a hydrogen atom or a substituent.

4. The ink sheet for heat-sensitive transfer recording material according to claim 1, wherein the azo dye is an azo dye represented by the following formula (2) or (3):

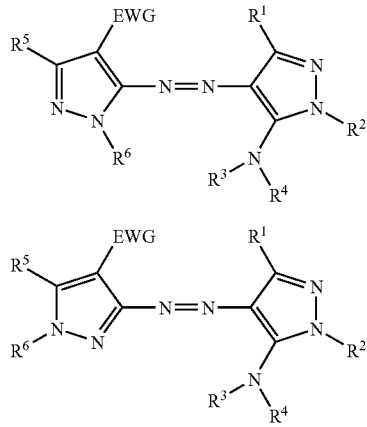

wherein $R^1$, $R^3$, $R^4$, $R^5$ and $R^6$ each independently represents a hydrogen atom or a monovalent substituent; $R^2$ represents a hydrogen atom, a substituted or unsubstituted alkyl group, a substituted or unsubstituted alkenyl group, a substituted or unsubstituted aryl group or a substituted or unsubstituted acyl group; and EWG represents an electron-withdrawing group.

5. A heat-sensitive transfer recording method which comprises forming an image by the application of heat on an image-receiving material comprising an ink-receiving layer containing a polymer provided on a support using an ink sheet for heat-sensitive transfer recording material according to claim 1.

6. An ink cartridge having an ink sheet for heat sensitive transfer recording material according to claim 1.

7. An azo dye represented by the following formula (4) or (5):

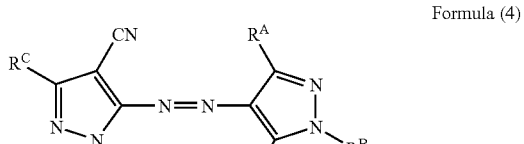

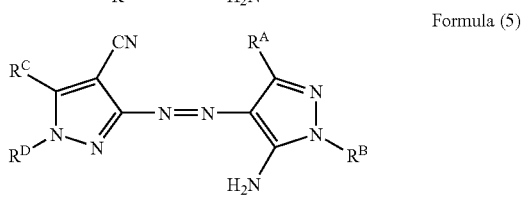

wherein $R^A$, $R^B$, $R^C$ and $R^D$ each independently represents a hydrogen atom or a $C_1$-$C_6$ alkyl group which may be substituted.

* * * * *